United States Patent
Das et al.

(10) Patent No.: US 10,585,656 B1
(45) Date of Patent: Mar. 10, 2020

(54) EVENT MANAGER FOR SOFTWARE DEPLOYMENT

(71) Applicant: CERNER INNOVATION, INC., Kansas City, KS (US)

(72) Inventors: Surojit Das, West Chester, PA (US); Kenneth J. Gerges, Jr., Souderton, PA (US); Prudhvi Naidu Kelam, Wayne, PA (US); Prabhakaran S. Ramady, Downingtown, PA (US); Stephen Donovan Rutherford, Malvern, PA (US); Joseph Sharkey, Phoenixville, PA (US)

(73) Assignee: Cerner Innovation, Inc., Kansas City, KS (US)

( * ) Notice: Subject to any disclaimer, the term of this patent is extended or adjusted under 35 U.S.C. 154(b) by 38 days.

(21) Appl. No.: 15/845,129

(22) Filed: Dec. 18, 2017

(51) Int. Cl.
*G06F 9/44* (2018.01)
*G06F 8/61* (2018.01)
*G06Q 10/06* (2012.01)
*G06F 9/455* (2018.01)
*G06F 11/34* (2006.01)
*G06F 11/30* (2006.01)

(52) U.S. Cl.
CPC .......... *G06F 8/61* (2013.01); *G06F 9/45558* (2013.01); *G06F 11/3003* (2013.01); *G06F 11/3476* (2013.01); *G06Q 10/06* (2013.01)

(58) Field of Classification Search
CPC .............. G06F 8/60; G06F 8/61; G06Q 10/06
See application file for complete search history.

(56) References Cited

U.S. PATENT DOCUMENTS

| 8,448,170 | B2 | 5/2013 | Wipfel et al. |
| 8,514,868 | B2 | 8/2013 | Hill |
| 8,543,916 | B2 | 9/2013 | Anderson et al. |
| 8,677,315 | B1 * | 3/2014 | Anderson ............... G06F 8/60 717/101 |

(Continued)

OTHER PUBLICATIONS

ZENworks® Configuration Management 2017, www.microfocus.com, Feb. 2, 2017, 8 pages. https://www.microfocus.com/products/zenworks/configuration-management/.

(Continued)

*Primary Examiner* — Duy Khuong T Nguyen
(74) *Attorney, Agent, or Firm* — Shook, Hardy & Bacon L.L.P.

(57) ABSTRACT

Methods, systems, and computer-readable media are disclosed herein that facilitate automatically audited software deployment. When a software deployment event is scheduled by a user, an event manager selects and bundles data, properties, and computer readable instructions for the deployment based on a particular client, environment, and/or release packet. At the scheduled time, the event manager automatically triggers deployment of the software via an integration manager, without the need for a software engineer. The event manager monitors the integration manager throughout processing of workflow to deploy software of the release packet. In near real-time, the event manager identifies when a failure occurs, identifies the specific cause of failures in a workflow, and sends the information as an alert to a user. The event manager also facilitates restarting processing of a workflow at a particular failed step.

18 Claims, 11 Drawing Sheets

(56) References Cited

U.S. PATENT DOCUMENTS

| | | | |
|---|---|---|---|
| 8,695,075 B2 | 4/2014 | Anderson et al. | |
| 8,745,205 B2 | 6/2014 | Anderson et al. | |
| 8,931,038 B2 | 1/2015 | Pulier et al. | |
| 9,069,599 B2 | 6/2015 | Martinez et al. | |
| 9,191,380 B2 | 11/2015 | Anderson et al. | |
| 9,207,928 B2 | 12/2015 | Fuller et al. | |
| 9,210,141 B2 | 12/2015 | Anderson et al. | |
| 9,262,152 B1 | 2/2016 | Kurian et al. | |
| 9,432,350 B2 | 8/2016 | Anderson et al. | |
| 9,507,583 B2 | 11/2016 | Kurian et al. | |
| 9,519,474 B2 | 12/2016 | Kurian et al. | |
| 9,910,654 B1* | 3/2018 | Brigham, II | G06F 8/61 |
| 10,146,524 B1* | 12/2018 | Killmon | G06F 8/65 |
| 2006/0195816 A1* | 8/2006 | Grandcolas | G06Q 40/02 717/101 |
| 2007/0220510 A1* | 9/2007 | Bell | G06F 9/453 717/174 |
| 2012/0216219 A1* | 8/2012 | Sharma | G06Q 50/24 719/331 |
| 2014/0208169 A1* | 7/2014 | Randhir | G06Q 10/06 714/45 |
| 2014/0282353 A1* | 9/2014 | Jubran | G06F 8/00 717/101 |
| 2015/0199188 A1* | 7/2015 | Mantripragada | G06F 8/60 717/101 |
| 2017/0177324 A1* | 6/2017 | Frank | G06F 16/173 |
| 2017/0235570 A1 | 8/2017 | Catalano et al. | |
| 2018/0060065 A1* | 3/2018 | Lai | G06F 8/71 |
| 2018/0121182 A1* | 5/2018 | Owen | G06F 8/60 |
| 2019/0138289 A1* | 5/2019 | Advani | G06F 8/61 |

OTHER PUBLICATIONS

DXC Agility Platform T™—DXC Technology Cloud Offerings, Apr. 8, 2017, 3 pages. https://www.dxc.technology/cloud/offerings/140040/140142-dxc_agility_platform.

Digital Signage Installation Services, Mvix, Jan. 31, 2016, 6 pages. http://mvixdigilalsignage.com/services/installation-services/.

Implementation Assistance—Mvix, Sep. 15, 2015, 8 pages. http://mvixdigilalsignage.com/services/implementation-assistance/.

DevOps at Scale and Compliance too? You Bet! Sep. 21, 2017, 5 pages. https://blog.xebialabs.com/2017/09/21/devops-at-scale-and-compliance-too-you-bet/.

Enterprise Release Management for DevOps & Continuous Delivery, Xebia Labs, Mar. 2, 2014, 8 pages. https://xebialabs.com/products/xl-release/.

Introduce Speed & Reliability to your Delivery Process, Xebia Labs, Mar. 6, 2014, 9 pages. https://xebialabs.com/products/xl-deploy/.

Orchestrating End-User Perspectives in the Software Release Process: An Integrated Release Management Framework, Hindawi Publishing Corporation, Dec. 24, 2014, 12 pages. ittps://www.hindawi.com/journals/ahci/2014/805307/.

* cited by examiner

FIG. 6

Milestone List for Event SFET_QA1717_4.2.200_sf_zdt_apply ~704 ~802 ~804 ~806

| Milestone | Start Date | End Date | Status |
|---|---|---|---|
| SF_ZDT_Apply_Start | 2017-07-20 15:58:54 EDT | 2017-07-20 15:58:58 EDT | Completed |
| Send ZDT Apply Start Notification | 2017-07-20 15:58:59 EDT | 2017-07-20 15:58:03 EDT | Completed |
| Pre-Cutover | 2017-07-20 15:59:04 EDT | 2017-07-20 15:59:12 EDT | Completed |
| Download Artifactory Media | 2017-07-20 15:59:06 EDT | 2017-07-20 15:59:06 EDT | Completed |
| Drain Users | 2017-07-20 15:59:08 EDT | 2017-07-20 15:59:08 EDT | Completed |
| Start Database Apply | 2017-07-20 15:59:08 EDT | 2017-07-20 15:59:08 EDT | Completed |
| Apply Limited Access Mode | 2017-07-20 15:59:10 EDT | 2017-07-20 15:59:10 EDT | Completed |
| Post-Apply Steps | 2017-07-20 15:59:11 EDT | 2017-07-20 15:59:11 EDT | Completed |
| Pause for Optional Components ~712 | 2017-07-20 15:59:16 EDT | 2017-07-20 15:59:55 EDT | Completed |
| Pre-Cutover Smoke Test | 2017-07-20 15:59:56 EDT | 2017-07-20 15:59:59 EDT | Completed |
| Cutover ~714 | 2017-07-20 16:00:00 EDT | 2017-07-20 16:00:04 EDT | Completed |
| Post-Cutover App Promote | 2017-07-20 16:00:05 EDT | 2017-07-20 16:00:09 EDT | Completed |
| Post-Cutover Smoke Test | 2017-07-20 16:00:10 EDT | 2017-07-20 16:00:13 EDT | Completed |

FIG. 8

EVENT MANAGER FOR SOFTWARE DEPLOYMENT

BACKGROUND

A "build" refers to the process of creating, developing, and revising computer-readable software by software developers and engineers. When a build is complete or "ready to go to production," the computer-readable software is deployed into production. Deploying software into production refers to the installation and/or configuration of the software for its intended use. In prior computer environments, software developers and engineers manually handled deployment by actively loading a release packet with a workflow and data needed for deployment into an environment and actively executing the workflow. As deployment of release packets generally required scheduling a whole team of software developers and engineers with extreme expertise to perform and oversee the process, release packets might be deployed using different environments, each application in a single release packet might be encoded in different computer programming languages, and different deployment configuration tools might be used for configuring destination servers. In practice, the team software developers and engineers needed to be familiar with all of the myriad different computer programming languages, environments, clients, and deployment configuration tools.

During deployment, software developers and engineers could not see into the "black box" during the execution of a workflow and could not monitor step-by-step progress during the execution of the workflow. Accordingly, when deployment failed, software developers and engineers were required to manually troubleshoot the entirety of the release packets and workflow. Subsequently, execution of the workflow for the release packet had to be restarted from the very beginning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for automatically audited software deployment. As will be described, the present invention provides an event manager that automatically deploys software based on a schedule, even in instances involving multiple, diverse computer environments and computer programming languages, without the need for a software engineer. Additionally, the present invention monitors or "audits" deployment and enables a feature for resuming deployment at failed processing points. Among other benefits, the invention eliminates manual interventions and overcomes prior technological limitations that required restarting deployment from the initial step.

A computerized method is provided in an embodiment of the present invention. The computerized method comprises receiving an indication to initiate a workflow based on user input, the user input specifying at least one of a client, an environment, and a release packet for the workflow. The computerized method further comprises identifying instructions specific to the at least one of the client, the environment, or the release packet for the workflow, without additional user input. The method comprises processing the instructions for the workflow in a runtime environment, in embodiments. The method includes monitoring the processing of the instructions in near-real time.

Another embodiment provides one or more non-transitory computer-readable media having computer-executable instructions embodied thereon that, when executed, perform a method. The method comprises receiving an indication to initiate a workflow having multiple steps based on user input, the user input specifying at least one of a client, an environment, and a release packet for the workflow. The method further comprises automatically identifying, by a processor, computer-executable instructions that are specific to the at least one of the client, the environment, or the release packet for the workflow. The method continues by automatically processing the instructions for the workflow in a runtime environment. In accordance with the invention, the method comprises monitoring the processing of the instructions at each of the multiple steps in the workflow to identify when processing of the instructions at one or more of the multiple steps in the workflow fails, wherein processing of the instructions in the runtime environment continues until processing of the instructions at all of the multiple steps in the workflow is successful or until processing of the instructions at one or more of the multiple steps in the workflow fails.

A system is provided in another embodiment. The system comprises a memory corresponding to a data layer, and a processor coupled to the memory. In accordance with the system, the processor, via an application layer supporting a user interface layer, initiates a workflow having multiple steps based on user input, the user input specifying one or more of a client, an environment, or a release packet for the workflow. In embodiments, the processor automatically identifies computer-executable instructions that are specific to the at least one of the client, the environment, or the release packet for the workflow, the computer-executable instructions stored in the one or more memory of the data layer. The processor also automatically processes the instructions for the workflow in a runtime environment. The processor, in accordance with the system, monitors the processing of the instructions at each of the multiple steps in the workflow to identify when processing of the instructions at one or more of the multiple steps in the workflow fails, wherein processing of the instructions in the runtime environment continues until processing of the instructions at all of the multiple steps in the workflow is successful or until processing of the instructions at one or more of the multiple steps in the workflow fails.

BRIEF DESCRIPTION OF THE DRAWINGS

Embodiments are described in detail below with reference to the attached drawings figures, wherein:

FIG. 6 depicts an exemplary graphical user interface (GUI) in accordance with embodiments of the present invention;

FIG. 8 depicts an exemplary GUI in accordance with embodiments of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A "build" refers to the process of creating, developing, and revising computer-readable software by a software developers and engineers. When a build is complete, the computer-readable software is deployed into production. Deploying software into production refers to the installation and/or configuration of the software for its intended use. The claimed embodiments of the present invention provide a technology agnostic solution for deploying computer-readable software. The claimed embodiments of the present invention automatically deploy software associated with multiple, diverse computer environments and computer programming languages, without the need for a software engineer. The claimed embodiments also self-audit each step in the deployment of software, which was not possible in previous computing technologies.

Figure 1:
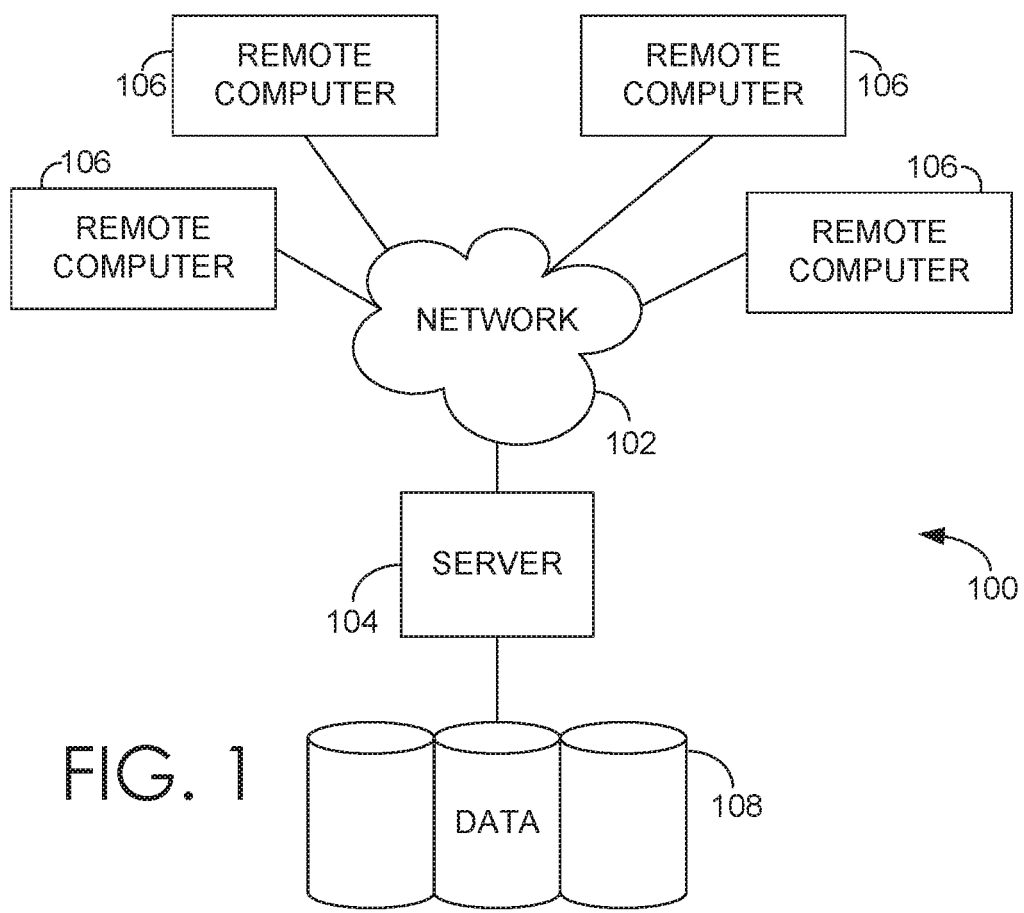
FIG. 1 is a block diagram of an exemplary environment suitable to implement embodiments of the present invention.

Beginning with FIG. 1, an exemplary computing environment is depicted, in accordance with an embodiment of the present invention. It will be understood by those of ordinary skill in the art that the exemplary computing environment 100 is just one example of a suitable computing environment and is not intended to limit the scope of use or functionality of the present invention. Similarly, the computing environment 100 should not be interpreted as imputing any dependency and/or any requirements with regard to each component and combination(s) of components illustrated in FIG. 1. It will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though devices and components are represented in FIG. 1 as singular devices and components, it will be appreciated that some embodiments may include a plurality of the devices and components such that FIG. 1 should not be considered as limiting the number of a device or component.

Continuing, the computing environment 100 of FIG. 1 is illustrated as being a distributed environment where components and devices may be remote from one another and may perform separate tasks. The components and devices may communicate with one another and may be linked to each other using a network 102. The network 102 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 102, generally, provides the components and devices access to the Internet and web-based applications.

The computing environment 100 comprises a computing device in the form of a server 104. Although illustrated as one component in FIG. 1, the present invention may utilize a plurality of local servers and/or remote servers in the computing environment 100. The server 104 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 104 may include or may have access to computer-readable media. Computer-readable media can be any available media that may be accessed by server 104, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 104. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the server 104 uses logical connections to communicate with one or more remote computers 106 within the computing environment 100. In embodiments where the network 102 includes a wireless network, the server 104 may employ a modem to establish communications with the Internet, the server 104 may connect to the Internet using Wi-Fi or wireless access points, or the server may use a wireless network adapter to access the Internet. The server 104 engages in two-way communication with any or all of the components and devices illustrated in FIG. 1, using the network 102. Accordingly, the server 104 may send data to and receive data from the remote computers 106 over the network 102.

Although illustrated as a single device, the remote computers 106 may include multiple computing devices. In an embodiment having a distributed network, the remote computers 106 may be located at one or more different geographic locations. In an embodiment where the remote computers 106 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some embodiments, the remote computers 106 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 106 may be physically located in a non-medical setting, such as a packing and shipping facility or deployed within a fleet of delivery or courier vehicles.

Continuing, the computing environment 100 includes a data store 108. Although shown as a single component, the data store 108 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 108 includes physical memory that is configured to store information encoded in data. For example, the data store 108 may provide storage for computer-readable instructions, computer-executable instructions, data structures, data arrays, computer programs, applications, and other data that supports the functions and action to be undertaken using the computing environment 100 and components shown in exemplary FIG. 1.

In a computing environment having distributed components that are communicatively coupled via the network 102, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the server 104 may access, retrieve, communicate, receive, and update information stored in the data store 108, including program modules. Accordingly, the server 104 may execute, using a processor, computer instructions stored in the data store 108 in order to perform embodiments described herein.

Although internal components of the devices in FIG. 1, such as the server 104, are not illustrated, those of ordinary skill in the art will appreciate that internal components and their interconnection are present in the devices of FIG. 1. Accordingly, additional details concerning the internal construction device are not further disclosed herein.

Figure 2:
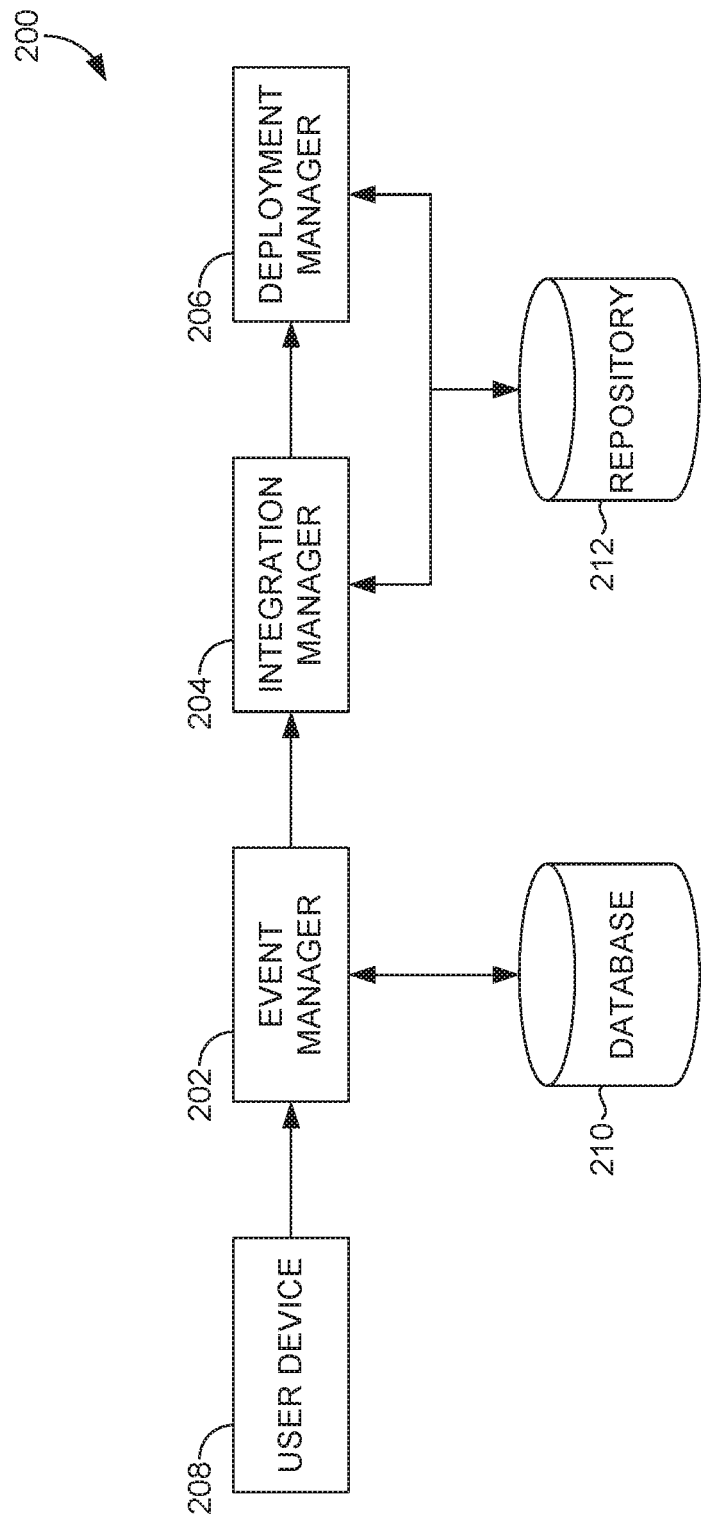
FIG. 2 is a block diagram of an exemplary system suitable to implement embodiments of the present invention.

FIG. 2 presents a diagram of an exemplary system 200 suitable to implement embodiments of the present invention. The system 200 includes an event manager 202 and an integration manager 204. In an embodiment, the system is communicatively coupled to at least one of a deployment manager 206, a user device 208, a database 210, or a repository 212. Communicatively couples refers to one or more hardwired or wireless connections between components that enable components to send and receive electronic data communications to one another and to otherwise interact through software and/or physical interfaces. In an embodiment, the system includes at least one of the deployment manager 206, the user device 208, the database 210, or the repository 212.

The event manager 202 is technology agnostic, meaning that the event manager is intelligently interoperable with several different computer programming languages and environments. Interoperability with several different computer programming languages and environments was previously missing in prior computer environments, such that a software engineer was required to be manually trained and "fluent" in different computer programming languages and environments and was required to manually and actively handle all aspects during software installation, also referred to as "deployment." Prior computer environments also left the engineer "blind" at the deployment stage, meaning that even the most highly-skilled software engineer, when deployment failed, had no knowledge of what, why, how, and when a failure occurred regarding steps in a workflow (described further below) being processed during deployment. As such, the highly-skilled software engineer was required to manually investigate and troubleshoot failures at each and every step in a workflow being deployed, and later, to restart the entire deployment from the beginning step of a workflow as there was no ability to pick up at the point of failure or a particular step in a workflow in prior computer environments. These technological problems and technological limitations found in prior computing systems are merely examples and should not be construed as limiting. The claimed embodiments provide novel solutions that address other problems and limitations not mentioned herein for brevity. Additional technological improvements generated by the claimed embodiments discussed herein will also become apparent, upon reading this Detailed Description, to those having an ordinary skill in the relevant art.

The event manager 202 receives user input specifying one or more of a client, an environment, or a release packet for the workflow. Generally, an "event" is scheduled, wherein the event refers to processing a workflow in order to deploy software, as specified in a release packet. Based on the user input specifying a client, environment, and/or release packet, the event manager 202 searches the database 210 and retrieves computer instructions stored in the database 210. The event manager 202 may itself initiate, or is otherwise triggered, to begin a process for deployment of software, including a release packet. The event manager 202 may organize and store information in the database 210 as structured data. In embodiments, the database 210 stores release packets, information for multiple and diverse environments, a list of servers for each of the multiple and diverse environments, and properties corresponding to each of the multiple and diverse environments. A release packet may be a library or an application, in embodiments. In an embodiment, a release packet includes one or more applications, a build level for each of the one or more applications, and identifiers for the one or more applications. As such, a release packet may be an application comprised of files, and the files may be computer instructions (e.g., hardware and/or software) that are usable for installation or setup. In contrast to a release packet, an artifact may simply be an output, a file, or a set of files, for example. Notably, each application within a single release packet may be encoded in different computer programming languages. In previous systems, release packets generally included files that shared the same data format.

Information that is specific to each of several different or related environments is stored in the database 210, as mentioned. Generally, an environment is a runtime environment to be used for implementing an execution model, also referred to as a workflow. A particular environment may be specified for use in processing a particular workflow, for example. A workflow comprises a plurality of steps to be processed or executed in a particular sequence. As a workflow is processed, a detailed audit log is created by recording the processing of each step in the workflow. The audit log may be stored in the database 210 and may be created by the event manager 202. The successful processing of a step or a failure may be communicated to the event manager directly from the event manager and/or the integration manager.

The event manager 202 retrieves computer instructions from the database 210 in order to communicate the computer instructions to the integration manager 204. The computer instructions are selected by the event manager 202 and are specific to a release packet. As such, the computer instructions are specifically selected by the event manager 202 regarding, for example, a workflow for that release packet, build levels for each application in the release packet, computer language script(s) used to write each application in the release packet (e.g., different scripts may be used within a single release packet), and configuration(s) of one or more servers to which the release packet is directed for installation. In embodiments, the event manager 202 automatically identifies computer-executable instructions that are specific to the at least one of the client, the environment, or the release packet for the workflow.

Once the event manager 202 communicates the computer instructions to the integration manager 20, the integration manager 204 initiates processing of the workflow having multiple steps. This communication may be performed without further user input. Based on the communication of the computer instructions from the event manager 202, the integration manager 204 automatically processes the computer instructions for the workflow in a runtime environment. In embodiments, the integration manager 204 performs execution of a workflow in order to install a release packet. To do so, the integration manager 204 utilizes the computer instructions and other information received from the event manager 202 to execute a particular workflow by processing each step in the workflow, in the order specified for the particular workflow. The execution of the workflow is performed to deploy or otherwise aid in the installation of computer software to a server or computing device, for example. The integration manager 204 is a continuous integration (CI) and continuous delivery environment, in some embodiments. Examples of continuous delivery pipelines include Jenkins®, Jenkins® Pipeline, Groovy, TeamCity, Travis CI, GitLab CI, and CodeShip. The integration manager 204 may process steps in the workflow and provide successfully executed steps to the deployment manager 206 for direction to an end location, such as a server or computing device. While a user at a user device may interact with the event manager 202 through an interface, the user does not interact with the integration manager 204.

The event manager 202, the integration manager 204, and/or the deployment manager 206 communicate with the repository 212. The terms "database" and "repository" do not have mutually exclusive meanings. Both a database and a repository may comprise locate, remote, and/or virtual memory for storage of data information.

In an embodiment, the repository 212 is a universal artifact repository for storing computer-readable software components. A binary repository manager may control the receipt and storage of artifacts in a universal artifact repository, in an embodiment. The execution of a workflow (also referred to as jobs) may deploy artifacts to a universal artifact repository where a binary repository manager links artifacts to a job that deployed the artifact and controls the storage of the artifacts. Exemplary repository managers that may operate regarding a DevOps toolchain include JFrog, ProGet (i.e., supports a NuGet repository), and Nexus. In addition to deployment and installation of computer software based on the execution of a workflow regarding a release packet, artifacts are generated during processing. Generally, an artifact is a tangible by-product resulting from the creation of a computer-readable software product during a software build, testing, and deployment stages. In an embodiment, an artifact is a binary artifact that represents at least a portion of a source file used in the development of a computer-readable software product. Examples of an artifact include a design document, a data model, a workflow diagram, a test matrix, a setup script, a use case, a class diagram, process plans, risk assessment, and the like generated and created during the build by a software developer or engineer. Artifacts are products of the process of developing software or a function of the software being developed, in embodiments. As such, artifacts comprise components of a computer-readable software product and/or components from the process of building the computer-readable software product, for example. The repository stores the artifacts during the development of computer-readable software, which forms a type of digital evidence of the build process. In embodiments, a binary repository manager stores artifacts with corresponding metadata in the repository. Metadata may be used to describe an artifact. For example, metadata may include an identifier, a build time, a build date, and dependencies of the artifact relative to other artifacts, where the metadata is specific to the corresponding artifact. Accordingly, the event manager 202, the integration manager 204, and/or the deployment manager 206 communicate with the repository 212 before, during, and/or after execution of a workflow in order to deploy artifacts to the repository 212, in an embodiment. When a workflow step is executed by the integration manager 204, an artifact is deployed to the repository 212 and stored in memory as linked to that particular step. As such, one or more artifacts may be linked to a single step, or alternatively, one artifact may be linked to multiple steps (e.g. deployment of the artifact being associated with processing of a series of related steps in a workflow). A record, a notification, or information regarding deployment of an artifact resulting from workflow execution by the integration manager 204 may be communicated to the event manager 202 and/or the deployment manager 206.

As the integration manager 204 executes the steps in a workflow and deploys artifacts, the integration manager 204 communicates with a deployment manager 206. When a step is executed successfully, the integration manager 204 communicates (e.g., computer software that is part of a release packet) with the deployment manager 206. The deployment manager 206 provides an interface between the integration manager 204 and the end destination for the release packet, such as a physical server. The deployment manager 206, generally speaking, is a configuration management tool for servers written as a deployment orchestration language. Examples of configuration management tools include CHEF, EPM, Puppet, Rudder, Salt, and Vagrant, SmartFrog, and CFEngine. The deployment manager 206 controls the configuration and reconfiguration of physical servers, and in this way, the execution of a workflow by the integration manager 204 installs a release packet to servers which are being configured or reconfigured by the deployment manager 206, at the direction of the integration manager 204 and in view of the release packet being installed. As such, the integration manager 204 installs the release packet to servers, whereas the deployment manager 206 confirms that destination servers have appropriate files and software, are correctly configured for receipt of the release packet (e.g., client, environment) at or during installation, and are functioning as intended. Generally, the integration manager 204 continues with processing of the computer instructions in the runtime environment and continues until processing of the computer instructions at all of the multiple steps in the workflow is successful or until processing of the instructions at one or more of the multiple steps in the workflow fails. The successfully processed steps are fed to the deployment manager 206, which interfaces with one or more servers to which the release package is being deployed and/or to which are being configured. Accordingly, based on the integration manager 204 automatically processing the instructions for the workflow in a runtime environment, one or more applications specified in the release packet are deployed and/or otherwise installed at a remote computing device associated with the client and the environment. In embodiments, the remote computing device is a physical server. In this way, one or more applications specified in the release packet are installed at a remote computing device using the automatically identified computer-executable instructions that are specific to the at least one of the client, the environment, or the release packet for the workflow.

As a workflow is performed via the integration manager 204, the event manager 202 monitors the processing of the instructions at each of the multiple steps in the workflow to identify when processing of the instructions at one or more of the multiple steps in the workflow fails. As such, the integration manager 204 and/or the deployment manager 206 communicate with the event manager 202. Through this monitoring, the event manager 202 records an audit trail and/or a log documenting processing of each step in the workflow. In instances when processing of a step in the workflow fails, the event manager 202 documents the failure, the particular step of the workflow, and diagnostic information. The event manager 202 communicates a notification to a user regarding the failure, for example, by generating and automatically sending a text message and/or email to the user, based on user contact information. The notification is not limited to a text message or email, however. The notification may include other modes of audio and/or visual presentation. The text message and/or email include information reporting the failure. In an embodiment, the text message and/or email include a hyperlink to redirect a user, when selected, to a GUI illustrating the audit trail created by the event manager 202. Accordingly, the event manager 202 represents a paradigm shift because, based on the user input, the event manager 202 automatically initiates software deployment without further user input and oversees the entirety of the software deployment via the integration manager 204 without further user input. The event manager 202 also enables a user to restart the deployment from a failed step of the workflow, which was not possible in prior computer environments.

For simplicity, the system 200 of FIG. 2 is shown without distinguishing between layers of a multiple virtual server (MVS) operating system. At a high level, an MVS operating system includes three layers: a data layer, an application layer, and a user interface/user experience (UI/UX) layer. The system 200 operates in accordance with an MVS operating system, such as OS/z. In an embodiment, the event manager 202, integration manager 204, and the deployment manager 206 operate at the UI/UX layer, are hosted by serverlets at the application layer, and are supported by data storage in a physical server at the data layer. The UI/UX layer may be web-based, in some embodiments. Accordingly, the system 200 includes one or more memory corresponding to the data layer and one or more processors coupled to the memory. Generally, the one or more processors, via an application layer supporting a user interface layer, performs the methods further discussed hereinafter.

Figure 3:
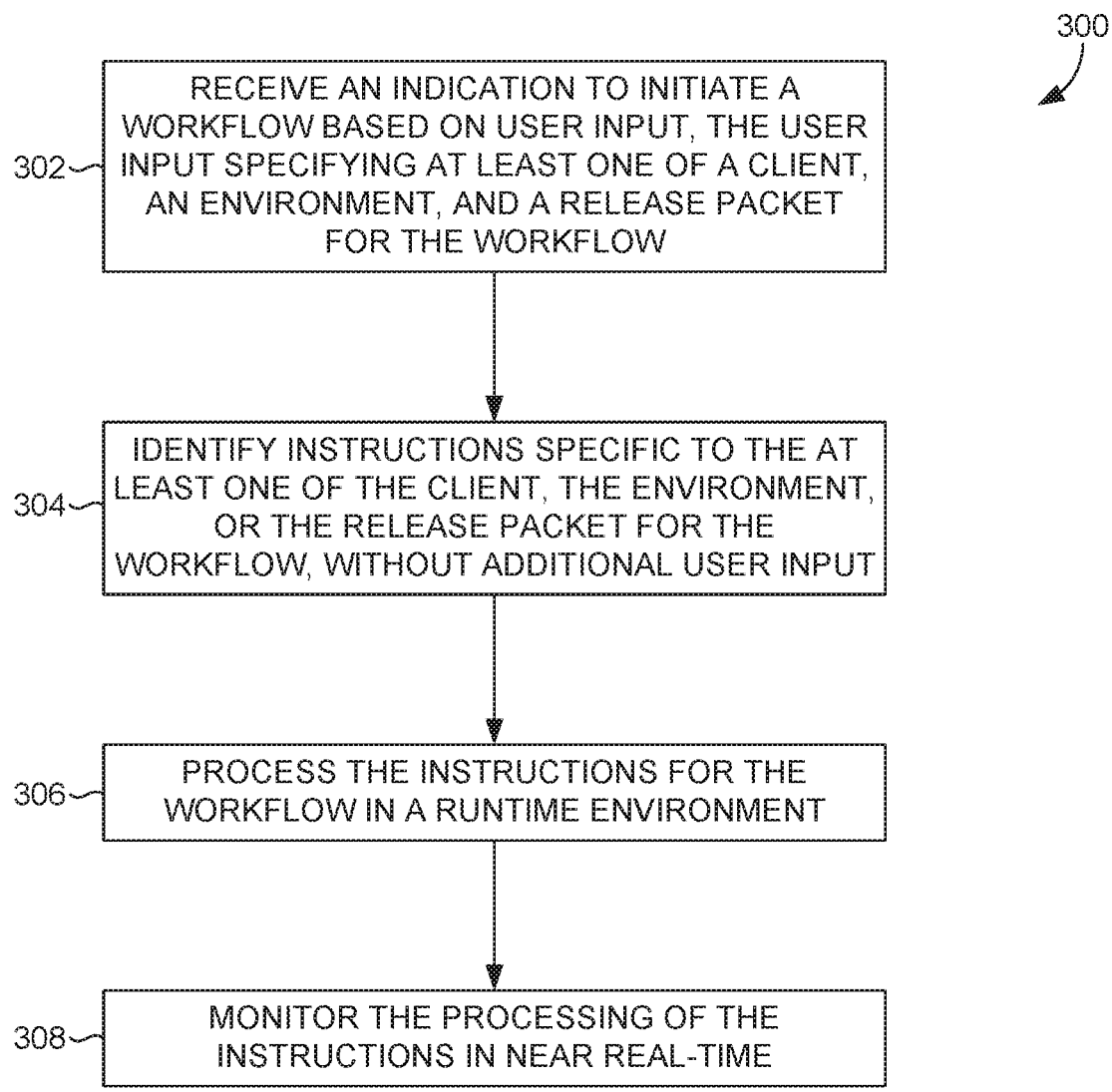
FIG. 3 is a flow diagram showing an exemplary method in accordance with an embodiment of the present invention.

Turning to FIG. 3, an exemplary method 300 is illustrated in accordance with the invention. At block 302, method 300 comprises receiving an indication to initiate a workflow based on user input. In an embodiment, the user input specifies at least one of a client, an environment, and a release packet for the workflow. The event manager 202 of FIG. 2, for example, receives the user input.

At block 304, the method comprises identifying instructions specific to the at least one of the client, the environment, or the release packet for the workflow. In an embodiment, instructions are identified automatically and without additional user input. For example, instructions are identified based only on the user input or submission of at least one of a client, an environment, and a release packet. No further user input or user interaction with a GUI is necessary to trigger the instruction locating aspect, in an embodiment. In a further embodiment, identifying instructions specific to the at least one of the client, the environment, or the release packet for the workflow, comprises at least one of identifying one or more applications specified in the release packet, identifying a build level for each of the one or more applications specified in the release packet, or identifying one or more properties associated with the one or more applications specified in the release packet. The event manager 202 of FIG. 2, for example, may identify instructions specific to the at least one of the client, the environment, or the release packet for the workflow. In further embodiments, identifying instructions specific to the at least one of the client, the environment, or the release packet for the workflow, further comprises identifying one or more applications specified in the release packet, identifying a build level for each of the one or more applications specified in the release packet, and/or identifying one or more properties associated with the one or more applications specified in the release packet. In accordance with the method 300, one or more properties associated with one or more applications specified in the release packet may be validated. Validation checks that the properties correspond to a defined data format that is compatible with the environment, for example, as specified in the user input. The event manager 202 of FIG. 2, for example, may perform a validation check of the user input, to ensure that a specified environment and release package, for example, are compatible. In another example, the event manager 202 of FIG. 2, for example, performs a validation check when identifying instructions to ensure that the instructions are compatible with the specified environment and release package.

At block 306, the method continues by processing the instructions for the workflow in a runtime environment. The runtime environment is associated with a java-based MVS system, in one embodiment. In an embodiment, the runtime environment is associated with a web application. In an embodiment, processing the instructions for the workflow in a runtime environment further comprises installing the one or more applications specified in the release packet using the build level for each of the one or more applications and the one or more properties associated with the one or more applications. An integration manager may utilize the properties during deployment. In embodiments, processing the instructions for the workflow in a runtime environment further comprises installing one or more applications specified in the release packet using a build level for each of the one or more applications and one or more properties associated with the one or more applications.

The method further comprises monitoring the processing of the instructions in near-real time, shown at block 308. Based on monitoring, the method may further comprise detecting a failure of a step in the workflow that interrupts processing of the workflow. The method may comprise documenting the failure of the step in the workflow in an audit log. Additionally, the method may further comprise communicating an alert to the user, the alert identifying the detection of a failure of the step in the workflow. In an embodiment, a request to restart the processing of the workflow is received from the user. In such an embodiment, the method comprises restarting the processing of the workflow at the step for which the failure was detected based on the request.

In further embodiments, the method 300 comprises identifying at least one server in a list of servers. The list of servers specifying a name, an environment, and a property associated with each of the servers. One or more servers may be identified based on the user input of a client, environment, and/or release package. A server may be identified because said server is associated with the client, an environment, and/or a release package, for example. In one embodiment, one or more servers are identified as being associated with the environment specified by the user input and as being associated with the client specified by the user input. The server(s) identified via the method 300 is/are server(s) to which the release package is to be deployed and/or installed. The list of servers may be stored in the database 210 shown in FIG. 2, for example. In such an embodiment, the method 300 installs one or more applications specified in the release packet of the user input at the at least one server identified in the list of servers. The installation of the applications utilizes the computer instructions previously identified as being specific to the at least one of the client, the environment, or the release packet for the workflow. In embodiments, the instructions are compatible with the environment and one or more properties that are associated with the identified server(s) in the list of servers.

Figure 4:
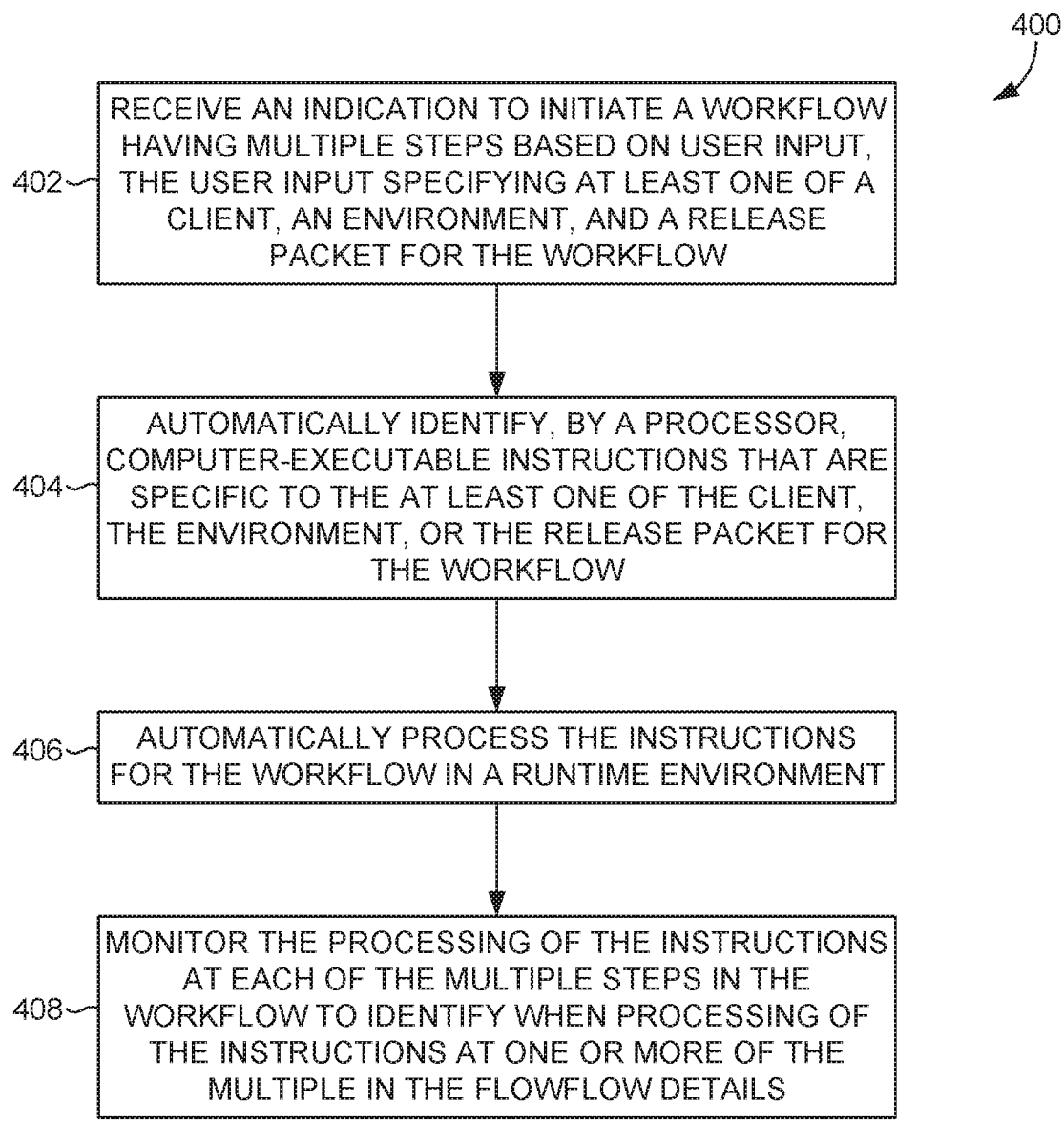
FIG. 4 is a flow diagram showing an exemplary method for in accordance with an embodiment of the present invention.

FIG. 4 depicts an exemplary method 400 in accordance with the invention. The method 400 comprises receiving an indication to initiate a workflow having multiple steps based on user input, at block 402. In embodiments, the user input specifies at least one of a client, an environment, and a release packet for the workflow.

The method 400 automatically identifies, by a processor (as opposed to a user), computer-executable instructions that are specific to the at least one of the client, the environment, or the release packet for the workflow, shown at block 404. In embodiments, automatically identifying computer-executable instructions that are specific to the at least one of the client, the environment, or the release packet for the workflow includes identifying one or more properties associated with the release packet for the workflow, and validating the one or more properties associated with the release packet. Validation checks that the one or more properties correspond to a defined data format that is compatible with an environment associated with the release packet.

At block 406, the method 400 automatically processes the instructions for the workflow in a runtime environment. In embodiments, processing of the instructions in the runtime environment continues until processing of the instructions at all of the multiple steps in the workflow is successful or until processing of the instructions at one or more of the multiple steps in the workflow fails. In processing the instructions, the method 400 installs one or more applications specified in the release packet by following ordered steps specified in the workflow. In an embodiment, automatically processing the instructions for the workflow in a runtime environment comprises installing software to a server. Installing software to a server may include initiating a drain mode at a first java virtual machine. Generally, placing a java virtual machine into a drain mode forces any users on said machine over other java virtual machines that are not in a drain mode.

While in the drain mode, the first java virtual machine may be updated. Then, software, such as applications in the release package, are installed onto the updated first java virtual machine in accordance with the workflow using the first java virtual machine. The integration manager 204 of exemplary FIG. 2, for example, may facilitate pushing a java virtual machine into a drain mode and updating a java virtual machine while in a drain mode.

And at block 408, the method 400 monitors the processing of the instructions at each of the multiple steps in the workflow to identify when processing of the instructions at one or more of the multiple steps in the workflow fails. In embodiments, monitoring the processing of the instructions in near-real time includes, for each of the multiple steps in the workflow, identifying whether the processing of the instructions at the step succeeded or failed. In embodiments, the method 400 detects a failure of a step in the workflow, and the failure interrupts processing of the workflow. When a failure occurs, it may be identified, for example, by the integration manager 204 and communicated to the event manager 202 shown in exemplary FIG. 2. Alternatively, a failure may be identified or detected by the event manager 202 of FIG. 2 when the integration manager 204 stops or halts processing of a workflow before the workflow is completed. Based on the monitoring of workflow, the event manager 202 of FIG. 2 has knowledge of the workflow being processed and steps therein such that the event manager 202 is able to recognize when processing of a workflow has prematurely terminated. In an embodiment, the method 400 includes documenting the failure of the step in the workflow in an audit log. An identifier of the failed step and other details regarding the failure of that particular step may be documented or recorded in an audit trail by the event manager 202 of FIG. 2, for example. The event manager 202 provides detailed monitoring capabilities such that the event manager 202 documents the cause of the failure, in addition to identifying when a failure has occurred. When a failure occurs, the method 400 stops processing of the workflow.

When processing at a step fails, the method 400 communicates an alert to a user in near real time. In an embodiment, the alert is one or more of an email or a text message. In an embodiment, the alert identifies the detection of a failure and identifies the particular step in the workflow associated with the failure. Because the user is notified of the step associated with the failure, the user is notified of the root of the failure and processing of the workflow may be subsequently resumed at that particular step. In an embodiment, the alert communicated to a user includes a hyperlink to redirect the user to the audit log of the event manager 202. In some embodiments, the method includes identifying the user to which the alert is to be communicated, identifying a role of the user, and based on the role of the user, communicating the alert. For example, a user may be assigned a role or a group and the role or the group may be provided with permissions that prevent or allow the user to control the event manager 202, the integration manager 204, and/or the deployment manager 206, for example. In embodiments, when a request to restart the processing of the workflow is received, the method 400 resumes by restarting the processing of the workflow at the step for which the failure was detected.

Figure 5:
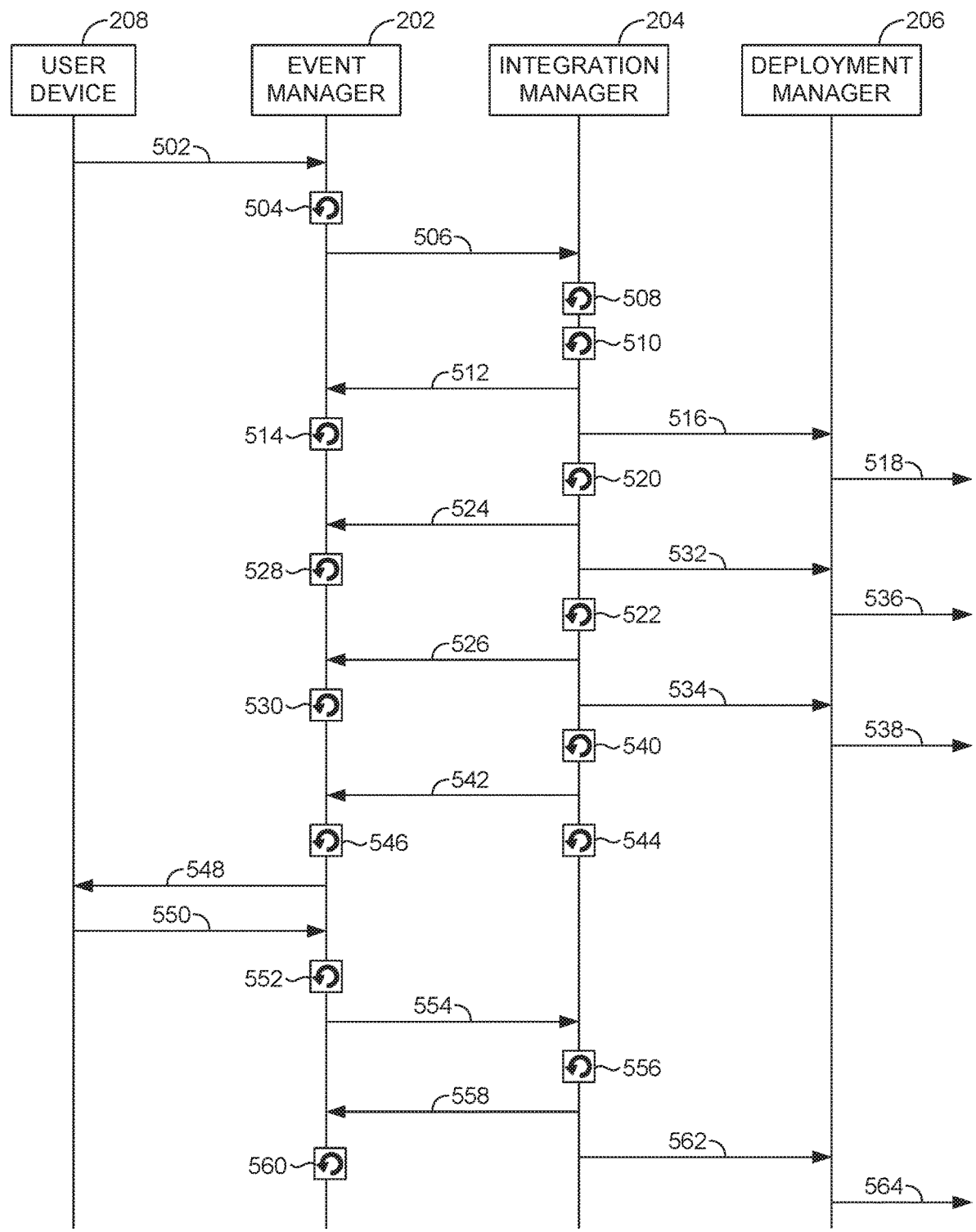
FIG. 5 is a diagram of exemplary system component interactions in accordance with an embodiment of the present invention.
Figure 6:
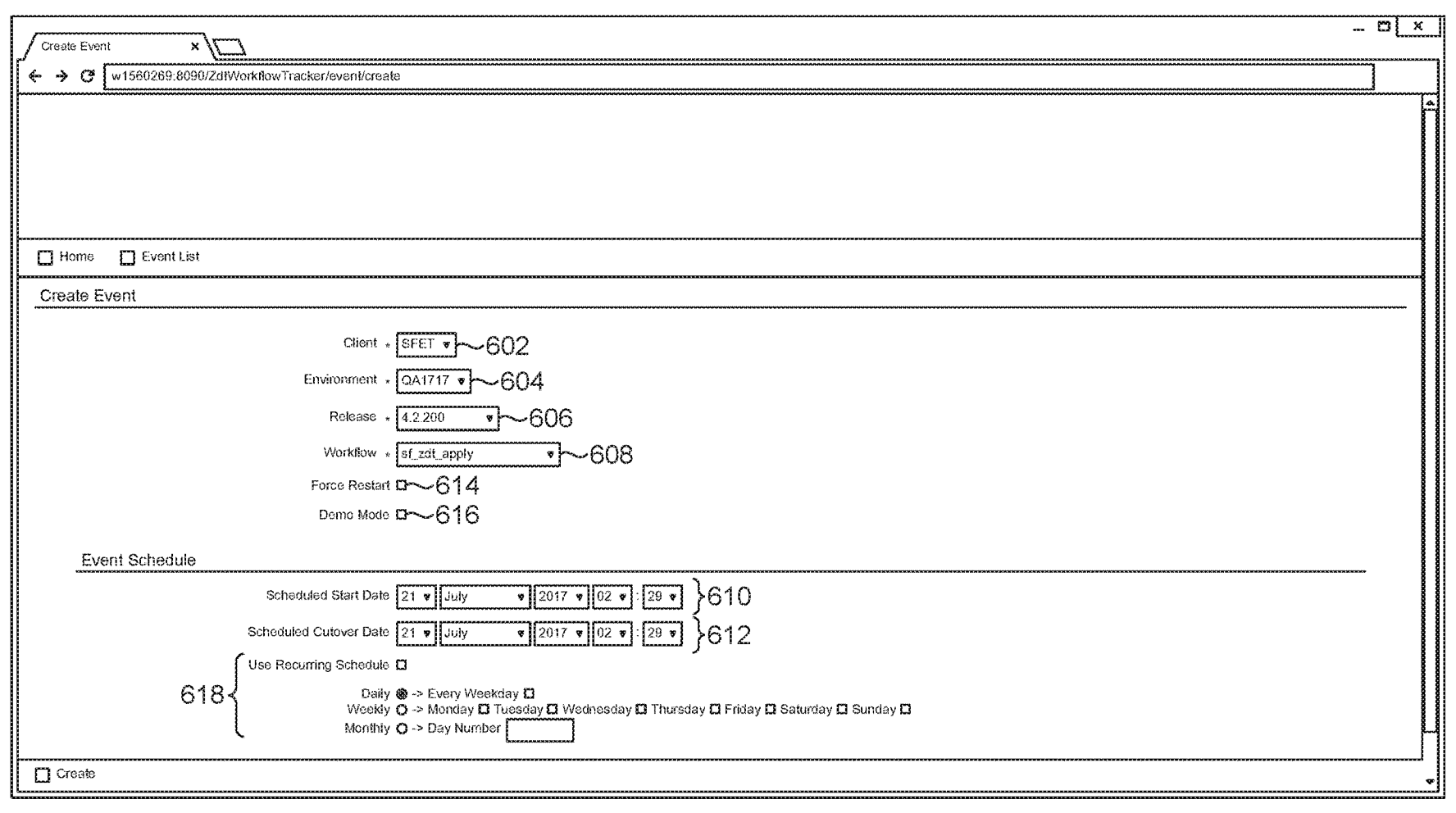

FIG. 5 depicts a diagram of exemplary system component interactions in accordance with an embodiment of the present invention. As shown in FIG. 5, the system components include an event manager 202 and an integration manager 204. The system components interact with each other, as well as a user device 208 and a deployment manager 206. As referred to with respect to FIG. 5, steps in a workflow correspond to processes performed for the deployment of computer-readable software at a software destination. Each process or "step" is handed off between system components in a sequential manner specified in a particular workflow, as each of the system components is responsible for performing specific actions regarding that step or process. Initially, a user at a user device 208 sends 502 user input to the event manager 202. The user input specifies at least one of a client, an environment, and a release packet for a workflow to be performed via the system. This user input may be received at any time prior to initiating the processing of the workflow. Accordingly, an event, which corresponds to processing a workflow to deploy software of a release packet, is scheduled in advance (e.g., minutes, days, weeks, months) of actual processing. The user input may specify a date and time at which the event manager 202 should initiate deployment and trigger the integration manager to begin processing. In this way, a user can "set it and forget it"—the event manager 202 handles all aspects of the deployment at the time the event is scheduled to begin. The exemplary graphical user interface (GUI) of FIG. 6 presents fields that are formatted for receiving user input such as a client 602, an environment 604, a release packet 606, a workflow 608, a start date and time 610, a cutover date and time 612. Additional fields that are formatted for receiving user input include selectable options such as force restart 614, demo mode 616, and/or a reoccurring scheduled event 618. The fields shown in FIG. 6 may be formatted as pull-down menus with selectable options prepopulated with available release packets, environments, and/or clients, in some embodiments.

Turning back to FIG. 5, an indication to initiate the workflow based on user input is received by the event manager 202. The indication may be the occurrence of the date and time specified by user input, for example, as shown in exemplary FIG. 6. The event manager 202 processes the user input. The event manager 202 identifies 504, without additional user input, computer-readable instructions that are specific to the at least one of the client, the environment, or the release packet for the workflow. The event manager 202 creates a bundle of data and computer-readable instructions that the integration manager 204 will utilize when deploying the software of the release packet. In embodiments, the bundled data is selected by the event manager 202 to include a workflow for the release packet, steps in the workflow, properties for applications in the release packet, identifiers for destination server(s) at which the release packet is directed, properties of the destination server(s), computer-readable instructions for installing each application in the release packet, build levels for the applications, and/or information about the environment specified in the user input. Each application may have an installation script written in a different computer programming language, in embodiments. The event manager 202 validates the properties of the applications and/or the servers by ensuring that the value specified for each of the properties match predefined data formats. Validation may be performed when all properties of the bundled data are assembled, throughout the bundling process, or in properties batched by application or server associations. When the bundled data is complete and contains all of the information the integration manager 204 may use to deploy the release packet, the event manager 202 communicates 506 the bundled data with the computer-readable instructions to the integration manager 204.

The integration manager 204 receives the bundled data with the computer-readable instructions. The integration manager 204 recognizes a workflow to be processed for deployment of the release packet. Then, the integration manager 204 begins processing 508 the computer-readable instructions for the workflow in a runtime environment, using data in the bundle. The integration manager 204 processes a first step 510 in the workflow.

When the first step in the workflow is processed successfully, an indication of the successful processing of the first step is communicated 512 to the event manager 202. The event manager 202, which is monitoring processing of the instructions for the workflow in real-time, documents 514 the successful processing of the first step in an audit log. The event manager 202 may document an identifier (e.g., a name) for the particular step, that the processing of that particular step was successfully completed, the date and start time when the integration manager 204 began processing the particular step, and/or the date and end time when the integration manager 204 completed processing of the particular step. Additionally, the event manager 202 may document when the processing of a particular step fails or is pending (e.g., processing of the step has begun but has not been finished or completed; an indication of success or failure has not yet been received). As such, while the interaction arrows between the event manager 202 and the integration manager 204 appear discrete, the event manager 202 is actually continuously or near continuously monitoring the performance of the integration manager 204 in processing the workflow.

When the first step in the workflow is processed successfully, the first step (e.g., corresponds to software) is communicated 516 to the deployment manager 206. The deployment manager 206 configures a destination server and relays 518 the first step to the destination server(s), completing of that first step/software at the destination server(s).

A communication of the indication of a successful processing of a step in the workflow to the event manager 202 may be sent concurrently with, before, or after a communication of the same step is sent to the deployment manager 206. The diagram of FIG. 5 is not intended to confer a temporal constraint and has been simplified for clarity. As such, the 'timing' depicted in FIG. 5 regarding communications to the event manager 202 reporting successful processing and communications of corresponding steps to the deployment manager 206 should not be construed as limiting.

As shown in the example of FIG. 5, multiple, sequential workflow steps are processed at 520 and 522 by the integration manager 204. Indications of the successful processing 520 and 522 of those steps in the workflow are communicated 524 and 526 to the event manager 202. The event manager 202 logs 528 and 530 these successful processes. The steps are passed 532 and 534 to the deployment manager 206. The deployment manager 206 ensures that a destination server (not shown) is appropriately configured and communicates 536 and 538 the steps to the destination server.

In the example interaction of FIG. 5, a failure occurs 540 in the processing of a particular step in workflow. An indication of the failure is communicated 542 to the event manager 202. Alternatively, the event manager 202 detects the failure when an indication of a successful processing of the step is not recognized within a specified period of time. The integration manager 204 stops 544 or halts the processing of the workflow. When a failure interrupts processing of the workflow, the event manager 202 documents 546 the failure of the step in the workflow in an audit log. The event manager 202 communicates 548 an alert to the user identifying the detection of a failure of the step in the workflow. A user at the user device 208 receives the alert and, in the scenario shown in FIG. 5, communicates 550 a request or instruction to the event manager 202 to resume processing. The event manager 202, having received the request or instruction from the user device, restarts 552 processing of the workflow by communicating 554 instructions to the integration manager 204 to resume processing of the workflow at the step where processing failed. The integration manager 204 restarts processing of the step where processing of the workflow failed. Based on changes, updates, or modifications made or input by the user, the processing 556 is successful and the integration manager continues to process the workflow. An indication of the successful processing of the previously failed step is communicated 558 to the event manager 202. The event manager 202, which is monitoring processing of the instructions for the workflow in real-time, documents 560 the successful processing of that step in an audit log for the workflow. The subsequently successfully processed step (e.g., corresponds to software) is communicated 562 to the deployment manager 206. The deployment manager 206 configures a destination server and relays 564 the first step to the destination server(s), completing of that first step/software at the destination server(s). The processing of the instructions in the runtime environment continues until processing of the instructions at all of the multiple steps in the workflow is successful or until processing of the instructions at one or more of the multiple steps in the workflow fails. The event manager 202 monitors processing of the workflow through the completion of the deployment of the release packet, generating a complete and detailed audit log at every step in the workflow.

Figure 7:
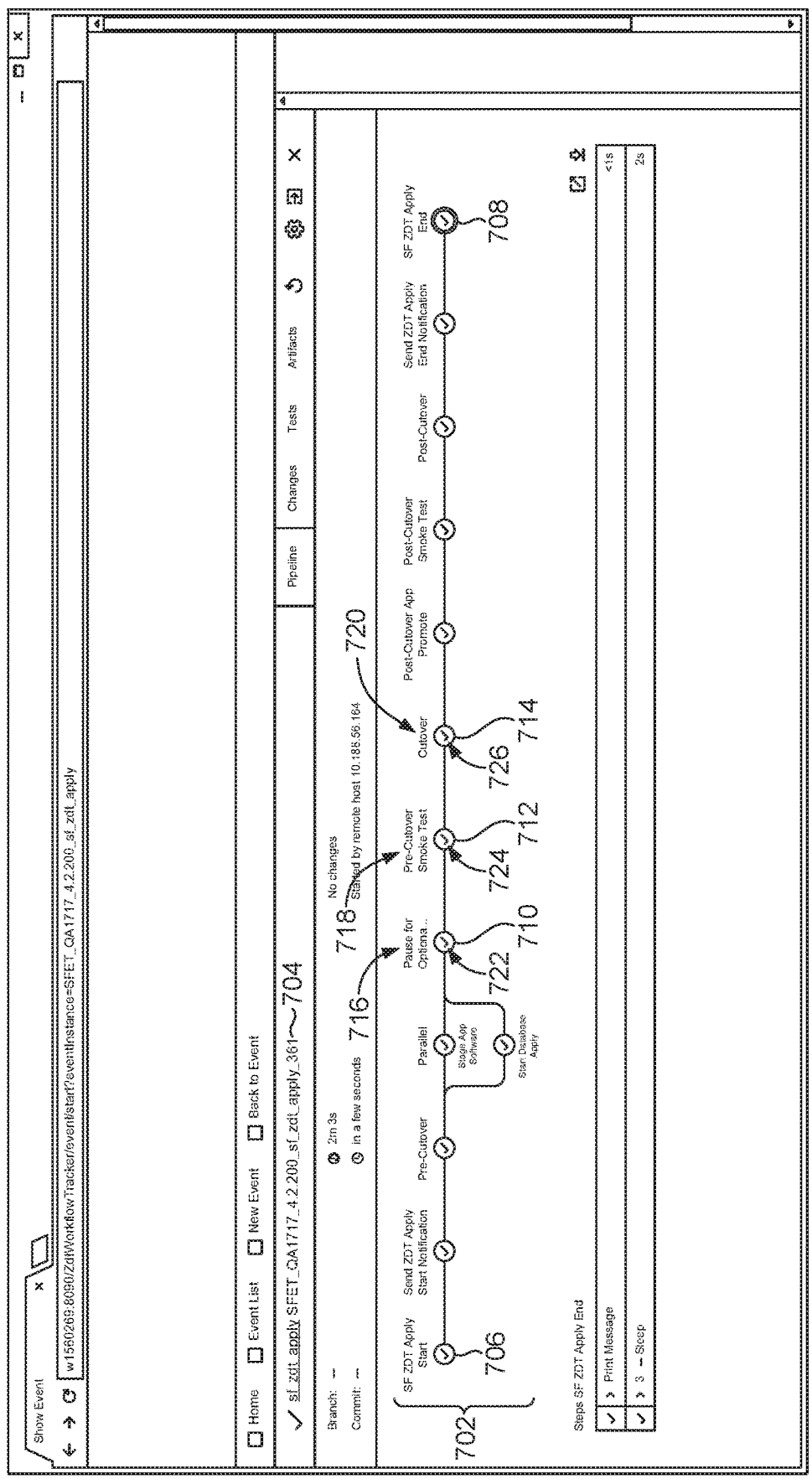
FIG. 7 depicts an exemplary GUI in accordance with embodiments of the present invention.

FIG. 7 depicts an exemplary GUI presenting an overview of an audit log 702 generated and maintained by the event manager 202 for a particular event (i.e., a scheduled processing of a workflow for a release packet 704). The audit log 702 is graphically presented in a pipeline diagram having an initial step 706, a final step 708, and multiple exemplary steps between 710, 712, and 714, all corresponding to a specific workflow for a release packet 704. Each of the steps is presented with corresponding identifiers or names 716, 718, and 720 and icons 722, 724, and 726, which visually communicate a success or failure of processing by the integration manager 204. The last step in the workflow for which processing was completed or at which processing was halted, shown as final step 708 and identified as "SF ZDT Apply End," is presented below the pipeline in the GUI.

FIG. 8 depicts another exemplary GUI presenting a detailed list view of the audit log 702 generated and maintained by the event manager 202, illustrating completed processing of various steps in a particular workflow for a release packet 704. In the detailed view of the audit log 702, steps 710, 712, and 714 are shown along with their corresponding identifiers or names, a date and start time 802 when the integration manager 204 began processing each respective step, a date and end time 804 when the integration manager 204 completed processing of each respective step, and a processing status 806 (i.e., completed, incomplete, failed, pending, scheduled).

Figure 9:
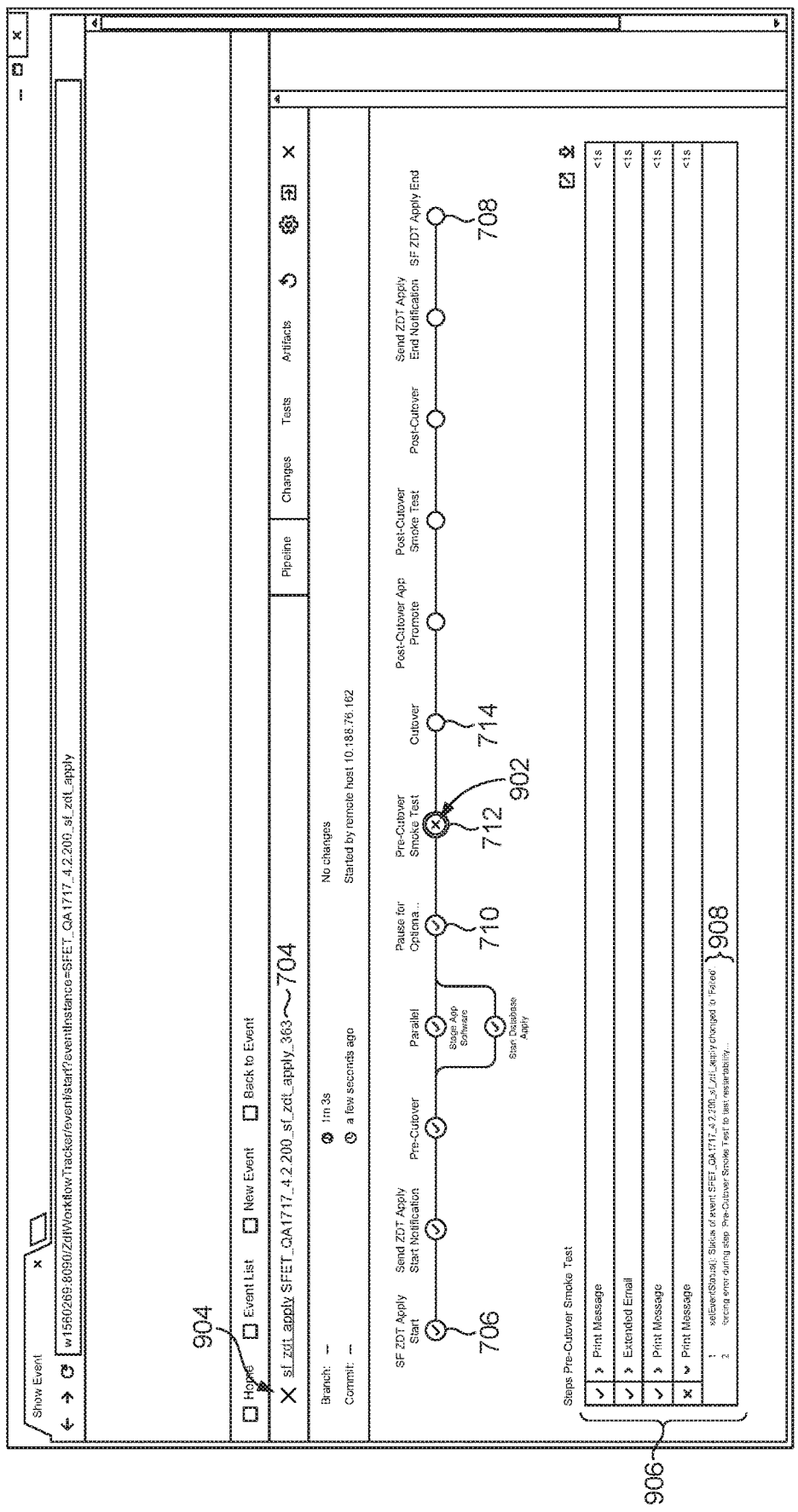
FIG. 9 depicts an exemplary GUI in accordance with embodiments of the present invention.

FIG. 9 depicts another exemplary GUI 900 presenting an overview of an audit log 702 generated and maintained by the event manager 202 for a particular event (i.e., a scheduled processing of a workflow for a release packet 704). Unlike the scenario of shown in FIG. 7, in this instance, the workflow has failed at a step 712 identified as "Pre-Cutover Smoke Test" in the workflow for the release packet 704. The audit log 702 is graphically presented in a pipeline diagram, but the failure of step 712 is represented with an icon 902 indicating a failure in its processing by the integration manager 204. Another icon 904 indicates the failure near the identifier of the release packet 704 on the GUI placed above the audit log 702 pipeline. The last step in the workflow for which processing was completed or at which processing was halted, shown as step 712, is presented below the audit log 702 pipeline in a list 906 of the steps in the workflow Additionally, the event manager 202 documented the failure and record information specifying the cause of the failure. This information 908 is presented in the list 906 (i.e., "forcing error during step 'Pre-Cutover smoke Test' to test restartability . . . "). In this way, failures and causes thereof are identified and specified so that a user may undertake appropriate corrections, thus eliminating manual trial-and-error troubleshooting. Additionally, because the user is notified of the step associated with the failure by the audit log 702 of the event manager 202, the user is notified of the cause or "root" of the failure and processing of the workflow may be subsequently resumed at that particular step.

Figure 10:
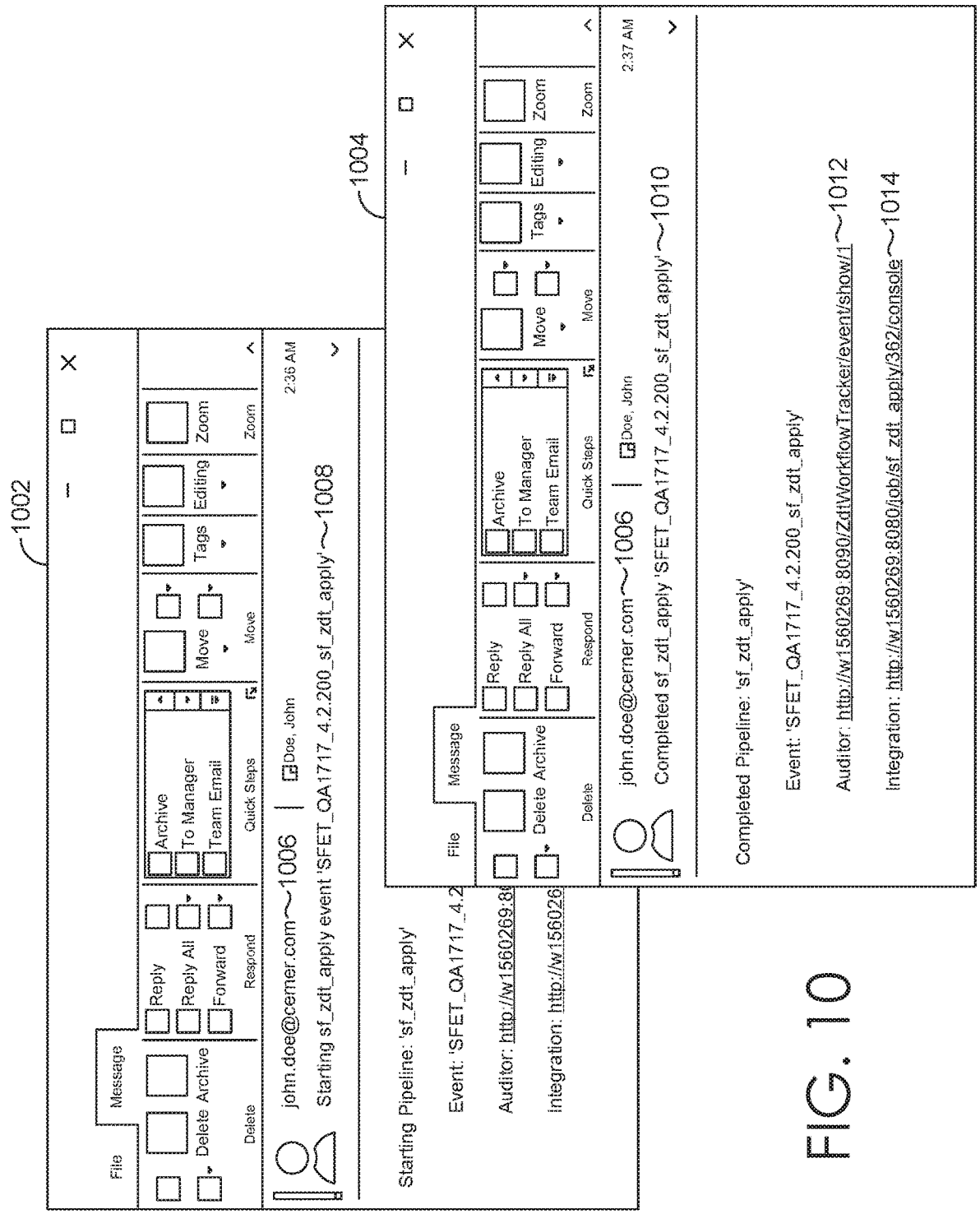
FIG. 10 depicts an exemplary GUI in accordance with embodiments of the present invention.

FIG. 10 depicts an exemplary GUI of alerts or notifications. In the example shown in FIG. 10, emails 1002 and 1004 are generated and communicated by the event manager 202 to one or more users (i.e., John Doe 1006) in near real time. The event manager 202 has access to user contact information stored in the database 210, for example. One of the emails 1002 notifies the user that the scheduled event (e.g., "SFET_QA1717_4.2") has begun, for example, that processing of a workflow for deployment has begun as discussed with regard to FIG. 5. The Subject Line 1008 of the email 1002 details this information ("Starting sf_zdt_apply event . . . "). Another email 1004 notifies the user that the scheduled event has concluded and, for example, that all steps in the workflow were successfully processed and the software for a release packet has been successfully deployed. The Subject Line 1010 of the email 1004 details this information ("Completed sf_zdt_apply event . . . "). Each of the emails 1002 and 1004 includes one or more hyperlinks 1012 to redirect a recipient to an audit log specific to the scheduled event. The emails 1004 and 1006 may also include one or more hyperlinks 1014 to redirect a recipient to the integration manager 204.

In further embodiments, an alert is communicated to one or more users (i.e., Jane Doe, John Doe) in near real time, relative to the failure's occurrence. The alert is presented as a text message and/or email message that identifies the scheduled event corresponding to the processing of the workflow in which the failure has occurred. The email message also includes a hyperlink to redirect a recipient to an audit log specific to the scheduled event corresponding to the processing of the workflow in which the failure has occurred.

As discussed previously, a user input may specify a later date and time at which the event manager 202 should initiate deployment and trigger the integration manager to begin processing. When an event is scheduled in advance (e.g., "set it and forget it"), the event manager 202 handles all aspects of the deployment at the time the event is scheduled to begin and emails such as those shown in FIG. 10 are sent to one or more users to signal the beginning and conclusion of the scheduled workflow, as well as to notify users of any failures. Accordingly, the users need not be involved with the actual deployment after the user input is provided and the event is scheduled.

In some embodiments, the event manager 202 identifies one or more specific users to which the alert is to be communicated, identifies one or more roles of the user(s), and based on the role of the user(s), communicates the alert to those user(s). In such an embodiment, the aforementioned hyperlinks may only be provided to users associated with a particular role and permissions. Accordingly, alerts may provide limited information to some users having restricted permissions. In various embodiments, alerts such as emails or text messages notifying one or more users that a scheduled event has begun, has concluded, or that a failure has occurred, are communicated to users associated with a role. The role may govern which users receive notifications.

Figure 11:
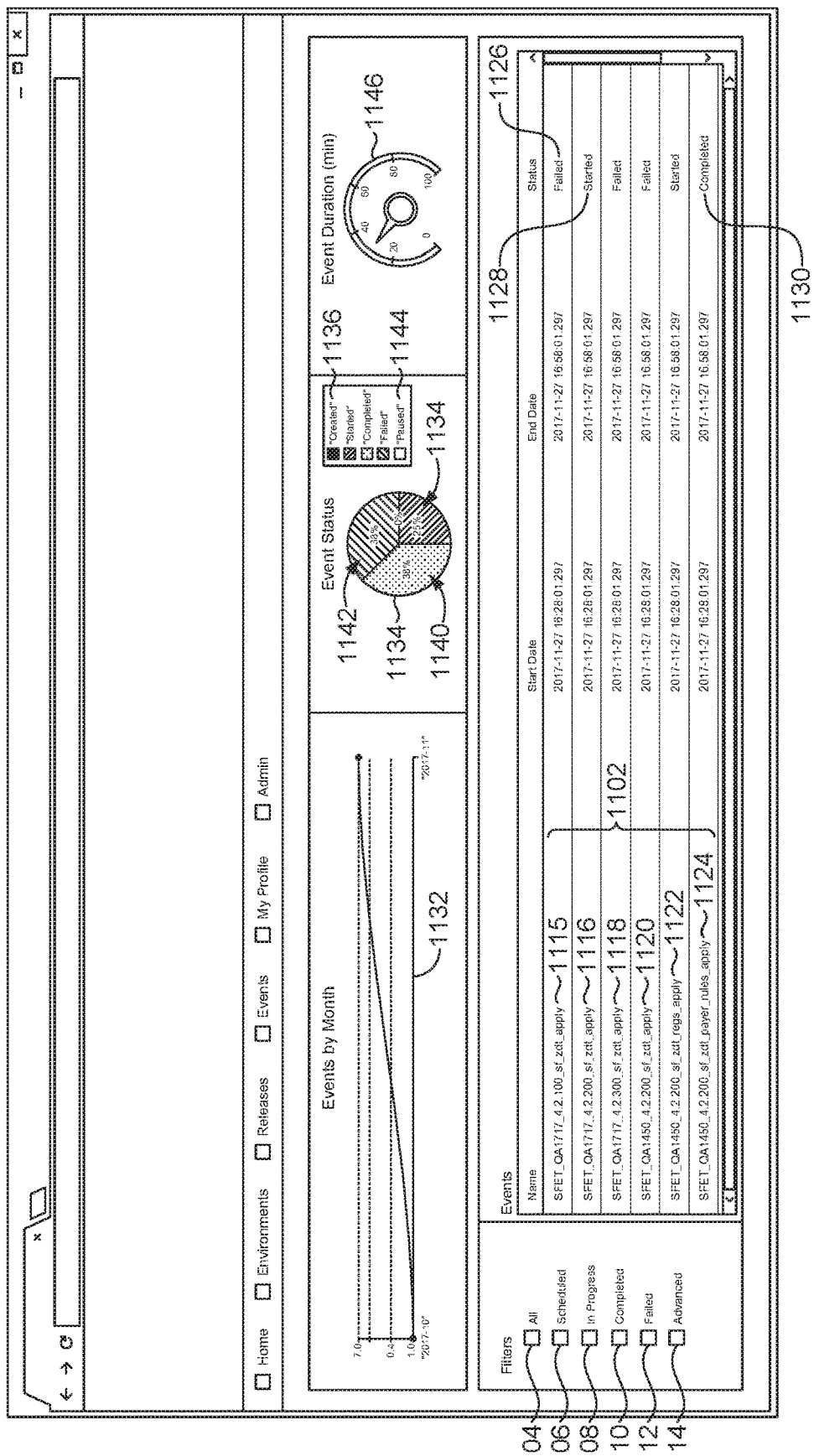
FIG. 11 depicts an exemplary GUI in accordance with the embodiments of the present invention.

Continuing, FIG. 11 depicts an exemplary GUI for presenting event-related information generated, captured, and/or accumulated by the event manager 202 over a period of time. In the example shown in FIG. 11, information regarding a list of events 1102 is shown. The GUI includes filters 1104, 1106, 1108, 1110, and 1112 that are individually selectable and/or selectable together in various combinations. A user may select to display all events (filter 1104), scheduled events (filter 1106), events in progress (filter 1108), complete events (filter 1110), failed events (filter 1112), or a combination thereof, such as complete events and failed events. A user-selection option 1114 is available in order to cause the display of advances features and/or to activate advanced features. For example, a user selection of the all events (filter 1104) causes all events to be displayed in the list of events 1102, including scheduled events, events in progress (i.e., being processed), complete events (i.e., deployment and installation completed successfully), and failed events (i.e., event where deployment and/or installation failed at some point in a workflow). A user may scroll the list of events, as well. Each event 1115, 1116, 1118, 1120, 1122, and 1124 in the list of events 1102 is individually selectable. In the exemplary GUI of FIG. 11, the list of events 1102 reflects a selection of all events (filter 1104), as evidenced by the varied statuses of the displayed events: event 1115 has a failed status 1126, event 1116 has a started status 1128, and event 1124 has a status of completed 1130.

In FIG. 11, the GUI presents an overview of multiple events that have, are, or will be managed by the event manager 202. The GUI includes a graphical representation 1132 that is a plot chart of a number of all events associated with a customizable time period, in embodiments. The graphical representation 1132 may be updated or changed to reflect when a filter is applied to the list of events 1102, such as, for example, all events (filter 1104), scheduled events (filter 1106), events in progress (filter 1108), complete events (filter 1110), or failed events (filter 1112), in embodiments.

The GUI includes another graphical representation 1134 that is a pie chart indicating a percentage breaking down the number of created events 1136, started events 1138, completed events 1140, failed events 1142, and paused events 1144, for example. The graphical representation 1134 presents event status information for all of the events associated with the customizable time period. The graphical representations 1132 and 1134 provide a user with information generated and/or captured by the event manager 202 over time and/or aggregated by the event manager 202 over an aggregation time period.

Additionally, the GUI presents a graphical representation 1146 presenting event duration information. The event duration information provides the amount of time used for events deployed and installed during the customized time period. The amount of time may be the average, the median, and/or the mode of all events associated with a customizable time period. The graphical representation 1146 presenting event duration information may be updated or changed to reflect created events 1136, started events 1138, completed events 1140, failed events 1142, and paused events 1144. The graphical representation 1146 presenting event duration information may be updated or changed to reflect when a filter is applied to the list of events 1102, such as, for example, all events (filter 1104), scheduled events (filter 1106), events in progress (filter 1108), complete events (filter 1110), or failed events (filter 1112), in embodiments. In this way, a user may be presented with important information regarding event duration relative to other time periods and/or events.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A computerized method comprising:
   receiving an indication to initiate a workflow based on user input, the user input specifying a client, an environment, and a release packet;
   automatically identifying, without additional user input, a server corresponding to the client and the environment specified, a programming language corresponding to the environment specified, the workflow corresponding to the release packet specified, and computer-executable instructions encoded in the programming language identified that are specific to at least one of the client, the environment, or the release packet;
   automatically bundling the release packet, the workflow, and the computer-executable instructions that are specific to at least one of the client, the environment, or the release packet;
   automatically processing the bundled release packet and the computer-executable instructions according to the workflow in the environment, wherein automatically processing the computer-executable instructions comprises installing, following the multiple steps in the workflow, one or more applications specified in the bundled release packet; and
   monitoring the automatic processing of the computer-executable instructions in near-real time.

2. The computerized method of claim 1, wherein automatically identifying the computer-executable instructions that are specific to the at least one of the client, the environment, or the release packet, further comprises:
   identifying the one or more applications specified in the release packet;
   identifying a build level for each of the one or more applications specified in the release packet; and
   identifying one or more properties associated with the one or more applications specified in the release packet; and
   wherein automatically processing the computer-executable instructions for the workflow in the environment further comprises installing the one or more applications specified in the bundled release packet using the build level for each of the one or more applications and the one or more properties associated with the one or more application.

3. The computerized method of claim 2, further comprising validating the one or more properties associated with the one or more applications specified in the release packet, wherein validation checks that the one or more properties correspond to a defined data format that is compatible with the environment.

4. The computerized method of claim 2, further comprising:
   identifying at least one server in a list of servers, the list of servers specifying a name, the environment, and at least one of the one or more properties associated with each of the servers, and
   wherein installing the one or more applications specified in the bundled release packet at the at least one server identified in the list of servers utilizes the computer-executable instructions that are specific to the at least one of the client, the environment, or the release packet for the workflow, and wherein the computer-executable instructions are compatible with the environment and the at least one property associated with the at least one server as specified in the list of servers.

5. The computerized method of claim 1, further comprising:
   detecting a failure of a step in the workflow that interrupts processing of the workflow;
   documenting the failure of the step in the workflow in an audit log; and
   communicating an alert to a user, the alert identifying the detection of the failure of the step in the workflow.

6. The computerized method of claim 5, further comprising:
   receiving a request from the user to restart the processing of the workflow; and
   restarting the processing of the workflow at the step for which the failure was detected based on the request.

7. One or more non-transitory computer-readable media having computer-executable instructions embodied thereon that, when executed, perform a method comprising:
   receiving an indication to initiate a workflow having multiple steps based on user input, the user input specifying a client, an environment, and a release packet;
   automatically identifying, by a processor, a server specifically corresponding to the client and the environment specified, a programming language specifically corresponding to the environment specified, the workflow specifically corresponding to the release packet specified, and computer-executable instructions encoded in the identified programming language that are specific to at least one of the client, the environment, or the release packet;
   automatically bundling the release packet, the workflow, and the computer-executable instructions that are specific to at least one of the computing destination, the programming language, or the release packet;
   automatically processing the bundled release packet and the computer-executable instructions according to the workflow in the environment, wherein automatically processing the computer-executable instructions comprises installing, following the multiple steps in the workflow, one or more applications specified in the bundled release packet; and
   monitoring the automatic processing of the bundled release packet and the computer-executable instructions at each of the multiple steps in the workflow to identify when processing of the computer-executable instructions at one or more of the multiple steps in the workflow fails,
   wherein processing of the computer-executable instructions in the environment continues until processing of the instructions at all of the multiple steps in the workflow is successful or until processing of the computer-executable instructions at one or more of the multiple steps in the workflow fails.

8. The media of claim 7, wherein automatically identifying, by the processor, the computer-executable instructions that are specific to the at least one of the client, the environment, or the release packet comprises:
identifying one or more properties associated with the release packet; and
validating the one or more properties associated with the release packet, wherein validation checks that the one or more properties correspond to a defined data format that is compatible with the identified environment.

9. The media of claim 7, wherein the method further comprises:
detecting a failure of at least one of the multiple steps in the workflow that interrupts processing of the workflow;
documenting the failure of the at least one step in the workflow in an audit log;
communicating an alert to a user, the alert identifying the detection of the failure of the at least one step in the workflow and including a hyperlink to the audit log; and
when a request to restart the processing of the workflow is received, restarting the processing of the workflow at the at least one step for which the failure was detected.

10. The media of claim 9, wherein the method further comprises:
identifying the user to which the alert is to be communicated;
identifying a role of the user; and
based on the role of the user, communicating the alert.

11. The media of claim 7, wherein the environment is associated with a java-based multiple virtual storage system.

12. The media of claim 7, wherein the environment is associated with a web application.

13. The media of claim 7, wherein automatically processing the computer-executable instructions for the workflow in the environment further comprises:
installing software to a server, wherein installing software to the server comprises:
initiating a drain mode for a first java virtual machine at the server, wherein the drain mode pushes any users to a second java virtual machine at the server;
updating the first java virtual machine; and
installing the one or more applications in accordance with the workflow onto the first java virtual machine.

14. The media of claim 7, wherein monitoring the processing of the computer-executable instructions in real-time comprises:
for each of the multiple steps in the workflow, identifying whether the processing of the computer-executable instructions at the step succeeded or failed;
recording whether each of the multiple steps in the workflow succeeded or failed; and
when it is identified that the processing of the computer-executable instructions at one or more of the multiple steps in the workflow failed, communicating an alert to a user in real time, wherein the alert is one or more of an email or a text message.

15. The media of claim 14, further comprising:
stopping the processing the computer-executable instructions of the workflow; and
communicating a notification to the user, the notification identifying the detection of a failure and identifying the step in the workflow associated with the failure.

16. A system comprising:
a memory corresponding to a data layer;
a processor coupled to the memory, wherein the processor, via an application layer supporting a user interface layer:
initiates a workflow having multiple steps based on user input, the user input specifying one or more of a client, an environment, or a release packet;
automatically identifies, without additional user input, a corresponding to the client and the environment specified, a programming language corresponding to the environment specified, the workflow corresponding to the release packet specified, and computer-executable instructions encoded in the programming language that are specific to the at least one of the client, the environment, or the release packet for the workflow, the computer-executable instructions stored in the one or more memory of the data layer;
automatically processes the bundled release packet and the computer-executable instructions according to the workflow in the environment, wherein the computer-executable instructions are automatically processed for the workflow in the environment by installing one or more applications specified in the bundled release packet; and
monitors the processing of the bundled release packet and the computer-executable instructions at each of the multiple steps in the workflow to identify when processing of the computer-executable instructions at one or more of the multiple steps in the workflow fails,
wherein processing of the computer-executable instructions in the environment continues until processing of the computer-executable instructions at all of the multiple steps in the workflow is successful or until processing of the computer-executable instructions at one or more of the multiple steps in the workflow fails.

17. The system of claim 16, wherein the remote computing device is associated with the client and the environment.

18. The system of claim 16, wherein the processor, based on automatically processing the computer-executable instructions for the workflow in the environment, installs the one or more applications specified in the bundled release packet at a remote computing device using the automatically identified computer-executable instructions that are specific to the at least one of the client, the environment, or the release packet for the workflow.

* * * * *

UNITED STATES PATENT AND TRADEMARK OFFICE
CERTIFICATE OF CORRECTION

PATENT NO. : 10,585,656 B1  
APPLICATION NO. : 15/845129  
DATED : March 10, 2020  
INVENTOR(S) : Surojit Das et al.

It is certified that error appears in the above-identified patent and that said Letters Patent is hereby corrected as shown below:

On the Title Page

Page 2, Column 2, Item (56), (Other Publications), Line 01: Please remove "Platform T™" and replace with --Platform™--.

Signed and Sealed this  
Twelfth Day of May, 2020

Andrei Iancu  
*Director of the United States Patent and Trademark Office*